(12) United States Patent
Miyake

(10) Patent No.: US 7,154,104 B2
(45) Date of Patent: Dec. 26, 2006

(54) RADIATION IMAGE STORAGE PANEL AND ITS PREPARATION

(75) Inventor: Kiyoteru Miyake, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 223 days.

(21) Appl. No.: 10/702,738

(22) Filed: Nov. 7, 2003

(65) Prior Publication Data

US 2004/0149929 A1 Aug. 5, 2004

(30) Foreign Application Priority Data

Nov. 7, 2002 (JP) ............................. 2002-324210

(51) Int. Cl.
 *H05B 33/00* (2006.01)
(52) U.S. Cl. .................................. 250/484.4
(58) Field of Classification Search ............. 250/484.4, 250/484.2, 475.2, 472.1
 See application file for complete search history.

(56) References Cited

U.S. PATENT DOCUMENTS

| 4,800,136 | A | * | 1/1989 | Arakawa et al. ............. 428/690 |
| 5,466,541 | A | * | 11/1995 | Van Havenbergh et al. 428/690 |
| 2001/0007352 | A1 | * | 7/2001 | Hell et al. ................ 250/484.4 |
| 2002/0158216 | A1 | * | 10/2002 | Neriishi et al. .............. 250/584 |

* cited by examiner

*Primary Examiner*—David Porta
*Assistant Examiner*—David S. Baker
(74) *Attorney, Agent, or Firm*—Sughrue Mion, PLLC

(57) ABSTRACT

A radiation image storage panel composed of a support, a phosphor matrix compound layer covering a surface of the support at a coverage percentage of 95% or more, and a stimulable phosphor layer (which is composed of multiple prismatic stimulable phosphor crystals standing on the phosphor matrix compound layer) formed on the phosphor matrix compound layer shows a high peel resistance between the support and the stimulable phosphor layer, and a high sensitivity, and gives a reproduced radiation image of high quality.

11 Claims, 1 Drawing Sheet

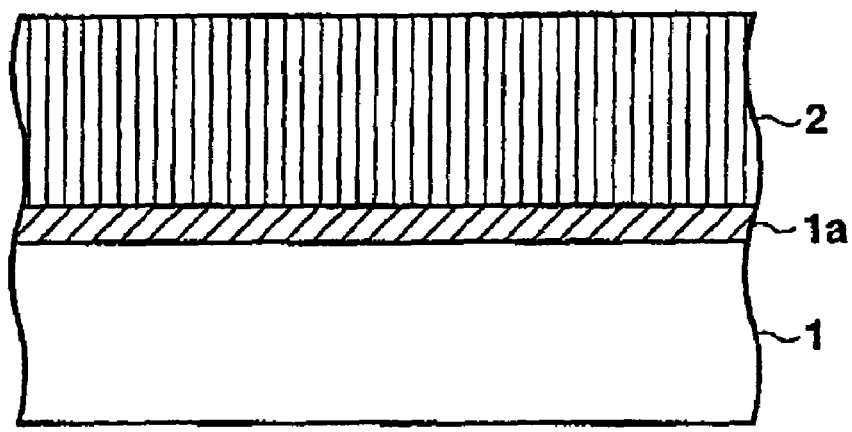

RADIATION IMAGE STORAGE PANEL AND ITS PREPARATION

FIELD OF THE INVENTION

The invention relates to a radiation image storage panel favorably employable in a radiation image recording and reproducing method utilizing stimulated emission of a stimulable phosphor.

BACKGROUND OF THE INVENTION

When the stimulable phosphor is exposed to radiation such as X-rays, it absorbs and stores a portion of the radiation energy. The stimulable phosphor then emits stimulated emission according to the level of the stored energy when the phosphor is exposed to electromagnetic wave such as visible light or infrared rays (i.e., stimulating light).

A radiation image recording and reproducing method utilizing the stimulable phosphor has been widely employed in practice. The method employs a radiation image storage panel comprising the stimulable phosphor, and comprises the steps of causing the stimulable phosphor of the storage panel to absorb radiation energy having passed through an object or having radiated from an object; sequentially exciting the stimulable phosphor with a stimulating light to emit stimulated light; and photoelectrically detecting the emitted light to obtain electric signals giving a visible radiation image. The storage panel thus treated is subjected to a step for erasing radiation energy remaining therein, and then stored for the use in the next recording and reproducing procedure. Thus, the radiation image storage panel can be repeatedly used.

The radiation image storage panel (often referred to s stimulable phosphor sheet) has a basic structure comprising a substrate (i.e., support) and a stimulable phosphor layer provided thereon.

The stimulable phosphor layer is conventionally formed by coating a dispersion of phosphor particles in a binder solution on the substrate and drying the coated dispersion on the substrate, and therefore comprises a binder and phosphor particles dispersed therein.

It is desired that radiation image storage panels used in these methods have sensitivity as high as possible and further can give a reproduced radiation image of high quality (in regard of sharpness and graininess).

It is known that a radiation image storage panel having on a substrate a stimulable phosphor layer prepared by gas phase deposition such as vacuum vapor deposition or sputtering has a stimulable phosphor layer comprising multiple prismatic (or pillar-shaped) stimulable phosphor crystals standing on the substrate, and gives a reproduced radiation image with high sensitivity as well as high sharpness.

Japanese Patent Publication No. 61-245099 describes a radiation image storage panel in which prismatic stimulable phosphor crystals comprising at least two layers are arranged an a support.

SUMMARY OF THE INVENTION

The present inventor has discovered that a layer of a stimulable phosphor comprising a phosphor matrix element and an activator which is formed on a substrate (i.e., support) by vapor deposition has a deformed crystal structure and is poor in its adhesion to the substrate so that the resulting stimulable phosphor layer is easily separated from the substrate, particularly, in the case that CsBr:Eu phosphor is deposited. It is assumed that the deformed crystal structure of the stimulable phosphor layer and the poor adhesion to the support are caused by the fact that the resulting phosphor crystals comprise divalent or trivalent Eu metal elements dispersed in monovalent metals elements of the matrix compound.

The present invention has an object to provide a radiation image storage panel showing high resistance to separation of the stimulable phosphor layer from the substrate, showing a high sensitivity, and yielding a reproduced radiation image with high quality.

According to further study made by the present inventor, it has been found that a radiation image storage panel prepared by first covering a surface of the substrate with a phosphor matrix compound layer almost uniformly at a coverage percentage of 95% or more and then depositing prismatic stimulable phosphor crystals on the phosphor matrix compound layer has prismatic stimulable phosphor crystals of good shape and high resistance to separation of the stimulable phosphor layer from the substrate.

Accordingly, the present invention resides in a radiation image storage panel comprising a support, a phosphor matrix compound layer covering a surface of the support at a coverage percentage of 95% or more, and a stimulable phosphor layer formed on the phosphor matrix compound layer, the stimulable phosphor layer comprising multiple prismatic stimulable phosphor crystals arranged on the phosphor matrix compound layer.

Preferred embodiments of the invention are described below:

(1) The stimulable phosphor layer is formed on the phosphor matrix compound layer by vapor deposition.

(2) The phosphor matrix compound layer is formed on the surface of the support by vapor deposition.

(3) The phosphor matrix compound layer comprises phosphor matrix compound particles which are deposited on the surface of the support and combined with each other.

(4) The phosphor matrix compound layer has a thickness in the range of 50 nm to 100 μm.

(5) The stimulable phosphor is an alkali metal halide phosphor having the formula (I):

$$M^{I}X \cdot aM^{II}X'_2 \cdot bM^{III}X''_3 : zA \qquad (I)$$

in which $M^{I}$ is at least one alkali metal element selected from the group consisting of Li, Na, K, Rb and Cs; $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; each of each of X, X' and X" independently is at least one halogen selected from the group consisting of F, Cl, Br and I; A is at least one rare earth element or metal element selected from the group consisting of Y, Ce, Pr, Nd, Sm, Eu, Gd, Th, Dy, Ho, Er, Tm, Yb, Lu, Mg, Cu, and Bi; and a, b and z are numbers satisfying the conditions of $0 \leq a < 0.5$, $0 \leq b < 0.5$ and $0 < z \leq 1.0$, respectively.

(6) The stimulable phosphor is an europium activated cesium bromide phosphor.

The radiation image storage panel of the invention can be favorably prepared by the process comprising the steps of:

forming a phosphor matrix compound layer on a surface of a support by vapor deposition whereby the phosphor matrix compound layer covers the surface at a coverage percentage of 95% or more; and forming a stimulable phosphor layer comprising multiple prismatic stimulable phosphor crystals on the phosphor matrix compound layer by vapor deposition.

In the above-mentioned process, it is preferred that the step of forming a phosphor matrix compound layer by vapor deposition and the step of forming a stimulable phosphor layer by vapor deposition are performed successively.

It is also preferred that the stimulable phosphor layer comprises a stimulable phosphor comprising a phosphor matrix element and an activator element, and the step of forming a stimulable phosphor layer by vapor deposition is performed by vaporizing a vaporization source comprising a phosphor matrix compound and a vaporization source comprising an activator compound simultaneously and depositing the vaporized sources on the matrix compound layer.

It is also preferred that the step of forming a stimulable phosphor layer by vapor deposition is performed at a pressure of 0.3 to 3 Pa in the presence of an inert gas.

BRIEF DESCRIPTION OF DRAWINGS

FIG. 1 shows a partial sectional view of a radiation image storage panel of the invention.

DETAILED DESCRIPTION OF THE INVENTION

In FIG. 1, the radiation image storage panel comprises a support (or substrate) 1, a phosphor matrix compound layeer (coverage layer) 1a, and a stimulable phosphor layer (sometimes simply referred as "phosphor layer") 2. The phosphor matrix compound layer covers the support surface at a coverage percentage of 95% or more. The phosphor matrix compound layer preferably has a thickness of 50 nm or more so that it satisfactorily covers the surface of the support at a coverage percentage of 95% or more. There is no specific upper limitation with respect to the thickness of the phosphor matrix layer. However, the thickness of the phosphor matrix layer preferably is not larger than 100 μm, from the viewpoint of recovering the emitted light. The stimulable phosphor layer preferably has a thickness in the range of 200 to 700 μm.

The coverage percentage (%) of the support surface by the matrix compound layer is determined by the steps of separating the stimulable phosphor layer and matrix compound layer together from the support, measuring a total of the bottom surface area of the matrix compound layer and the bottom surface area of the stimulable phosphor layer, measuring the bottom surface area of the matrix compound layer, and calculating a percentage of the bottom surface area of the matrix compound layer per the total bottom surface area of the matrix compound layer and the stimulable phosphor layer. If the bottom surfaces of the matrix compound layer and the stimulable phosphor layer have concaves and/or convexes, the surface areas are measured after projecting the bottom surfaces perpendicularly on a smooth plane.

The radiation image storage panel may have one or more auxiliary layers such as a protective layer or other layers.

The radiation image storage panel of the invention is preferably prepared by a vapor deposition method. Details of the vapor deposition method are described below.

The process for preparing a radiation image storage panel of the invention can be performed by the steps of:

forming a phosphor matrix compound layer on a surface of a support by vapor deposition whereby the phosphor matrix compound layer covers the surface at a coverage percentage of 95% or more; and forming a stimulable phosphor layer comprising multiple prismatic stimulable phosphor crystals on the phosphor matrix compound layer by vapor deposition.

The support (i.e., substrate) preferably is a sheet of quartz glass, sapphire, metal (e.g., aluminum, iron, tin, or chromium) or heat-resistant resin (e.g., aramide resin). The support may have an embossed surface or a surface having concaves and/or convexes. On the substrate can be placed a light reflecting layer such as a layer containing a titanium dioxide or a light absorbing layer such as a layer containing carbon black.

On the substrate, a phosphor matrix compound layer is formed, preferably, by vapor deposition.

The phosphor matrix compound layer preferably comprises a matrix compound of a stimulable phosphor which is later formed on the phosphor matrix compound layer.

The stimulable phosphor preferably emits a stimulated emission in the wavelength region of 300 to 500 nm upon simulation with a stimulating light having a wavelength region of 400 to 900 nm.

A preferred group of the stimulable phosphor is an alkali metal halide phosphor having the formula (I)

$$M^I X \cdot aM^{II} X'_2 \cdot bM^{III} X''_3 : zA \qquad (I)$$

in which $M^I$ is at least one alkali metal element selected from the group consisting of Li, Na, K, Rb and Cs; $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, TM, Yb, Lu, Al, Ga and In; each of each of X, X' and X" independently is at least one halogen selected from the group consisting of F, Cl, Br and I; A is at least one rare earth element or metal element selected from the group consisting of Y, Ce, Pr, Nd, Sm, Eu, Gd, Tb, Dy, Ho, Er, Tm, Yb, Lu, Mg, Cu, and Bi; and a, b and z are numbers satisfying the conditions of $0 \leq a < 0.5$, $0 \leq b < 0.5$ and $0 < z \leq 1.0$, respectively.

In the formula (I), z preferably is a number satisfying the condition of $5 \times 10^{-4} \leq z \leq 0.1$. $M^I$ preferably comprises Cs. X preferably comprises Br. A preferably is Eu or Bi. Most preferred is Eu. Accordingly, as the stimulable phosphor, CsBr:Eu (europium activated cesium bromide) is most preferred.

In the case that the stimulable phosphor of the formula (I) contains an europium activator, the europium compound of the evaporation source preferably comprise a divalent europium ($Eu^{2+}$) compound and a trivalent ($Eu^{3+}$) compound. The europium compound preferably is $EuBr_x$ in which x preferably satisfies the condition of $2.0 \leq x \leq 2.3$. It is preferred that the europium compound contains the divalent europium compound as much as possible, at least 70%.

Another preferred stimulable phosphor is a rare earth activated alkaline earth metal fluoride-halide phosphor having the following formula (II):

$$M^{II} FX:zLn \qquad (II)$$

in which $M^{II}$ is at least one alkaline earth metal element selected from the group consisting of Ba, Sr and Ca; Ln is at least one rare earth element selected from the group consisting of Ce, Pr, Sm, Eu, Tb, Dy, Ho, Nd, Er, Tm and Yb; X is at least one halogen selected from the group consisting of Cl, Br and I; and z is a number satisfying the condition of $0 < z \leq 0.2$.

In the formula (II), Ba is preferably included in an amount of half or more of $M^{II}$, and Ln particularly preferably is Eu or Ce. The $M^{II}FX$ in the formula (II) indicates the crystal structure of BaFX, and it by no means indicates F:X=1:1. The formula (II), therefore, does not indicate resultant stoichiometric composition. It is generally preferred to produce many $F^+$ ($X^-$) centers (which are vacant lattice points of $X^-$ ion) in a BaFX crystal, so as to enhance the efficiency of emission stimulated by light in the wavelength region of 600 to 700 nm. In many cases, F is in slight excess of X.

In the first place, a substrate (i.e., support) is covered with a matrix compound of a stimulable phosphor. The coverage of the substrate with the matrix compound can be performed by gas phase deposition procedures such as vapor deposition, sputtering, or chemical vapor deposition (CVD). The vapor deposition for the formation of the covering matrix compound layer can be carried out using a vacuum chamber to be employed for the following formation of a stimulable phosphor layer on the matrix compound layer. The matrix compound layer can be produced using a evaporation source comprising the matrix compound or a mixture of substances which react with each other and give the matrix compound.

The matrix compound layer generally has a bottom layer comprising multiple particular or disc-shaped grains which are combined with each other on the substrate. The grains generally have a mean diameter of 0.1 to 5 µm, and the bottom layer generally has a thickness of 30 nm to 3 µm. On the bottom layer, one or more similar thin layer can be formed. The matrix compound layer should cover the surface of the substrate at a coverage percentage of 95% or more so that it can serve to firmly combine the substrate and a stimulable phosphor layer which is formed on the matrix compound layer. The matrix compound layer has a thickness of not less than 50 nm, preferably not less than 1 µm, more preferably not less than 10 µm.

On the matrix compound layer (i.e., covering layer), a stimulable phosphor layer is formed by vaporization of an evaporation source and deposition of the produced vapor on the matrix compound layer of the substrate.

The vaporization of the evaporation source and deposition of the produced vapor can be performed in a vacuum evaporation apparatus comprising a vacuum chamber equipped with a vacuum pump, a supporting plate for evaporation source, heating means, and a supporting means for the substrate on which the vapor is to be deposited.

The evaporation source preferably is in the form of a tablet having a water content of not more than 0.5 wt %.

Moreover, the evaporation source preferably has a relative density of 80% or more. The relative density means a value obtained by dividing a density of the evaporation source by the inherent density of the corresponding material. The evaporation source of a high relative density can be evaporated uniformly and then is effective to produce a deposited stimulable phosphor layer of a uniform thickness.

For performing the vacuum evaporation, the evaporation source is placed directly on the supporting plate or placed in a crucible or dish which is then placed on the supporting plate. A number of evaporation sources can be employed simultaneously in the vacuum evaporation. The substrate is attached to the supporting means in the position over the evaporation sources.

For the preparation of the phosphor layer on a substrate, it is preferred to employ two or more evaporation sources such as a combination of an evaporation source (such as in the form of tablet) comprising a matrix component and an evaporation source (such as in the form of tablet) comprising an activator component.

In the evaporation procedure, an evaporation source or evaporation sources comprising a matrix component and an activator component independently or in combination and a substrate can be first set in a vacuum evaporation apparatus. The substrate is placed perpendicularly to the direction in which the vapor comes out of the source. The apparatus is then evacuated to give an inner pressure of $1\times10^{-5}$ to $1\times10^{-2}$ Pa for electron beam evaporation or 0.3 to 3 Pa (preferably 0.5 to 1.5 Pa) for resistance heating evaporation. An inert gas such as Ar gas or Ne gas is preferably incorporated into the apparatus.

In the vapor deposition procedure, one or more evaporation sources of stimulable phosphor material are set in the evaporation apparatus. The evaporation sources can be a combination of one or more evaporation sources of the matrix component and one or more evaporation sources of the activator component.

The evaporation source are then heated by applying an electron beam or heating a resistance heating means, to form a matrix compound layer and a prismatic stimulable phosphor crystalline layer on the substrate. In the vapor deposition, the prismatic phosphor crystals deposit on the matrix compound coverage layer (which is preferably composed of combined small grains) to give well-shaped prismatic stimulable phosphor crystals.

In the electron beam evaporation, an electron beam generated by an electron gun is applied onto the evaporation source. The accelerating voltage of electron beam preferably is in the range of 1.5 kV to 5.0 kV. By applying the electron beam, the evaporation source of matrix component and activator element is heated, vaporized, and deposited on the substrate. In the resistance heating evaporation, the evaporation sources are heated by supplying electric energy to the resistance heating means. The deposition rate generally is in the range of 0.1 to 1,000 µm/min., preferably in the range of 1 to 100 µm/min. The substrate may be cooled or heated, if needed, during the deposition process.

After the procedure for forming the matrix compound layer and the stimulable phosphor layer on the substrate is complete, the resulting layer can be subjected to heat treatment (annealing treatment).

The stimulable phosphor layer preferably has a thickness of 50 to 1,000 µm, more preferably 200 to 700 µm.

The formed phosphor layer comprises prismatic stimulable phosphor crystals which are aligned almost perpendicularly to the substrate. Thus formed phosphor layer comprises only the stimulable phosphor with no binder, and there are produced cracks extending the depth direction in the phosphor layer.

As described above, the vacuum evaporation or deposition method is not restricted to the electron beam-evaporating method, and various known methods such as resistance-heating method, sputtering method, and CVD method can be used.

It is preferred to place a transparent protective film on the surface of the stimulable phosphor layer, so as to ensure good handling of the radiation image storage panel in transportation and to avoid deterioration. The protective film preferably is transparent. Further, for protecting the storage panel from chemical deterioration and physical damage, the protective film preferably is chemically stable, physically strong, and of high moisture proof.

The protective film can be provided by coating the stimulable phosphor film with a solution in which an organic polymer (e.g., cellulose derivatives, polymethyl methacrylate, fluororesins soluble in organic solvents) is dissolved in a solvent, by placing a beforehand prepared sheet for the protective film (e.g., a film of organic polymer such as polyethylene terephthalate, a transparent glass plate) on the phosphor film with an adhesive, or by depositing vapor of inorganic compounds on the phosphor film.

Various additives may be dispersed in the protective film. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyisocyanate). The thickness of the protective film generally is in the range of about 0.1 to 20 μm (if the film is made of polymer material) or in the range of about 100 to 1,000 μm (if the film is made of inorganic material such as silicate glass). For enhancing the resistance to stain, a fluororesin layer is preferably provided on the protective film. The fluororesin layer can be form by coating the surface of the protective film with a solution in which a fluororesin is dissolved or dispersed in an organic solvent, and drying the coated solution. The fluororesin may be used singly, but a mixture of the fluororesin and a film-forming resin can be employed. In the mixture, an oligomer having polysiloxane structure or perfluoroalkyl group can be further added. In the fluororesin layer, fine particle filler may be incorporated to reduce blotches caused by interference and to improve the quality of the resultant image. The thickness of the fluororesin layer is generally in the range of 0.5 to 20 μm. For forming the fluororesin layer, additives such as a crosslinking agent, a film-hardening agent and an anti-yellowing agent can be used. In particular, the crosslinking agent is advantageously employed to improve durability of the fluororesin layer.

Thus, a representative radiation image storage panel of the invention can be prepared. The storage panel of the invention may be in known various structures. For example, in order to improve the sharpness of the resultant image, at least one of the films may be colored with a colorant which does not absorb the stimulated emission but the stimulating rays.

The present invention is further described by the following examples.

EXAMPLE 1

Two Source Evaporation (1) Starting Materials

Powdery cesium bromide (CsBr, purity: 4N or higher) and powdery europium bromide (EuBr$_x$, x=approx. 2.2, purity: not lower than 3N) were employed as the starting materials. The analysis of each starting material by ICP-MS method (inductively coupled plasma spectroscopy—mass spectroscopy) revealed that each of alkali metals other than Cs (Li, Na, K, Rb) and each of alkaline earth metals (Mg, Ca, Sr, Ba) were present in the cesium bromide in amounts of less than 10 ppm and less than 2 ppm, respectively, and each of rare earth elements other than Eu and each of other elements were present in the europium bromide in amounts of less than 20 ppm and less than 10 ppm, respectively.

Since both starting materials were highly hygroscopic, they were stored in a desiccator under dry atmosphere showing a dew point of lower than −20° C., and taken out just before the following preparation was made.

(2) Formation of Matrix Compound Layer and Stimulable Phosphor Layer

A synthetic quartz substrate was washed successively with an aqueous alkaline solution, purified water, and isopropyl alcohol, and then mounted to a substrate holder within an evaporation apparatus. Each of the powdery CsBr and powdery EuBr$_x$ was placed in a crucible and was set on the predetermined site of the apparatus. Subsequently, the apparatus was evacuated using a combination of a rotary pump, mechanical booster, and turbo molecular pump to reach 1×10$^{-3}$ Pa. Subsequently, Ar gas was introduced int the apparatus until the inner pressure reached 0.6 Pa.

In the apparatus, the substrate was continuously heated to 100° C. by means of a sheath heater placed on the back side of the substrate.

Each of the powdery CsBr and powdery EuBr$_x$ was heated by resistance-heating means under the condition that all shutters arranged between the evaporation sources and the substrate were closed. Then, a shutter shielding the powdery CsBr from the substrate was opened, to deposit CsBr on the substrate whereby a matrix compound coverage layer was formed on the substrate. After one second, a shutter shielding the powdery EuBr$_x$ from the substrate was opened, to deposit a stimulable CsBr:Eu phosphor layer on the matrix compound coverage layer. The deposition rate was 5 μm/min. The Eu/Cs atomic ratio was adjusted to become 0.003/1 by controlling the electric power supplied to each resistance-heating means.

After the evaporation-deposition procedure was complete, the inner pressure was returned to atmospheric pressure, and the substrate was taken out of the apparatus. On the substrate, a matrix compound coverage layer (thickness: 80 nm) and a stimulable phosphor layer (thickness: approx. 500 μm, area: 10 cm×10 cm) consisting of prismatic phosphor crystals aligned densely and perpendicularly were formed.

Thus, a radiation image storage panel of the invention having a substrate, a deposited matrix compound layer and a deposited stimulable phosphor layer (see FIG. 1) was prepared.

EXAMPLE 2

Two Source Evaporation

The procedures of Example 1 were repeated except that the shutter for the powdery EuBr$_x$ was opened 3 seconds after the opening of the shutter for the powdery CsBr, to prepare a radiation image storage panel of the invention having a substrate, a deposited matrix compound layer and a deposited stimulable phosphor layer.

EXAMPLE 3

Two Source Evaporation

The procedures of Example 1 were repeated except that the shutter for the powdery EuBr$_x$ was opened 10 seconds after the opening of the shutter for the powdery CsBr, to prepare a radiation image storage panel of the invention having a substrate, a deposited matrix compound layer and a deposited stimulable phosphor layer.

EXAMPLE 4

Two Source Evaporation

The procedures of Example 1 were repeated except that the shutter for the powdery EuBr$_x$ was opened 30 seconds after the opening of the shutter for the powdery CsBr, to prepare a radiation image storage panel of the invention having a substrate, a deposited matrix compound layer and a deposited stimulable phosphor layer.

EXAMPLE 5

Two Source Evaporation

The procedures of Example 1 were repeated except that the shutter for the powdery $EuBr_x$ was opened 300 seconds after the opening of the shutter for the powdery CsBr, to prepare a radiation image storage panel of the invention having a substrate, a deposited matrix compound layer and a deposited stimulable phosphor layer.

EXAMPLE 6

Two Source Evaporation

The procedures of Example 1 were repeated except that the shutter for the powdery $EuBr_x$ was opened 600 seconds after the opening of the shutter for the powdery CsBr, to prepare a radiation image storage panel of the invention having a substrate, a deposited matrix compound layer and a deposited stimulable phosphor layer.

COMPARISON EXAMPLE 1

Two Source Evaporation

The procedures of Example 1 were repeated except that the shutter for the powdery $EuBr_x$ and the shutter for the powdery CsBr are simultaneously opened, to prepare a radiation image storage panel for comparison having a substrate and a deposited stimulable phosphor layer.

COMPARISON EXAMPLE 2

Two Source Evaporation

The procedures of Example 1 were repeated except that the shutter for the powdery $EuBr_x$ was first opened, and after one second the shutter for the powdery CsBr was opened, to prepare a radiation image storage panel for comparison having a substrate, a deposited activator compound layer and a deposited stimulable phosphor layer.

COMPARISON EXAMPLE 3

Two Source Evaporation

The procedures of Example 1 were repeated except that the shutter for the powdery $EuBr_x$ was opened 0.5 seconds after the opening of the shutter for the powdery CsBr, to prepare a radiation image storage panel for comparison having a substrate, a deposited matrix compound layer and a deposited stimulable phosphor layer.

COMPARISON EXAMPLE 4

One Source Evaporation

The procedures of Example 1 were repeated except for employing a mixture of the powdery CsBr and $EuBr_x$ (x=approx. 2.2) as the evaporation source. The evaporation source was heated by the resistant heating means and a shutter shielding the evaporation source from the substrate was then opened to deposit a stimulable CsBr:Eu phosphor on the substrate. Thus, a radiation image storage panel for comparison having a substrate and a deposited stimulable phosphor layer was prepared.

Evaluation of Radiation Image Storage Panel (1) The resulting radiation image storage panels were evaluated in their adhesion between the substrate and the stimulable phosphor layer, conditions of the prismatic crystals, and reproducibility of sensitivity, according to the below-mentioned procedures.

In addition, a coverage percentage was measured by the following procedures: the stimulable phosphor layer aid matrix compound layer together were separated from the substrate; the exposed bottom surface of the matrix compound layer was coated with gold by ion sputtering (thickness: 30 angstroms); the gold coated surface was observed by a scanning electron microscope (JSM-5400, Japan Electronic Co., Ltd.), and a percentage (%) of the bottom surface area of the matrix compound layer per the total bottom surface area of the matrix compound layer and the stimulable phosphor layer was calculated.

(1) Adhesion (Peel Strength)

An adhesive layer of an adhesive tape (cellophane tape available from Nichiban Co., Ltd.) was pressed on the stimulable phosphor layer, the adhesive tape was peeled from the phosphor layer, and the phosphor layer remaining on the substrate was observed to determine a percentage (%) of a surface area of the phosphor layer separated from the substrate. This procedure was designed with reference to a scottie tape method described in "Handbook for preparation, evaluation, and application of thin film" edited by GONDA Shunich, Fujitechno System, 1984, page 211.

(2) Conditions of Prismatic Crystals

The radiation image storage panel was sectioned in the depth direction. The section face was coated with gold by ion sputtering, and observed by a scanning electron microscope to mark the conditions of the prismatic phosphor crystals according to the following criteria:

AA: very good, A: good, B: slightly deformed, C: extremely deformed and practically not acceptable (3) Reproducibility of Sensitivity A number of radiation image storage panels were produced for each Example and Comparison Example. Each radiation image storage panel was encased in a room light-shielding cassette and then exposed to X-rays (10 mR). Subsequently, the storage panel was taken out of the cassette and scanned with LD laser beam (wavelength: 650 nm). The stimulated emission was detected by a photomultiplier to examine the luminance of stimulated emission emitted from each storage panel. The reproducibility (variation) of sensitivity is marked according to the following criteria:

AA: very good, A: good, B: slightly varying, C: extremely varying and practically not acceptable The results of evaluations are set forth in Table 1.

TABLE 1

| | Matrix compound layer | | Separation | Crystal conditions | Reproduction |
|---|---|---|---|---|---|
| | thickness | coverage | | | |
| Example 1 | 80 nm | 96% | 3% | AA | A |
| Example 2 | 250 nm | 98% | 2% | AA | AA |
| Example 3 | 800 nm | 99% | 2% | AA | AA |
| Example 4 | 2400 nm | 100% | 1% | AA | AA |
| Example 5 | 24000 nm | 100% | 1% | AA | AA |
| Example 6 | 48000 nm | 100% | 1% | AA | AA |
| Com. Ex. 1 | 0 nm | 0% | 25% | AA | B |
| Com. Ex. 2 | ~0 nm | ~0% | 40% | C | C |

TABLE 1-continued

| | Matrix compound layer | | | Crystal | Repro- |
| --- | --- | --- | --- | --- | --- |
| | thickness | coverage | Separation | conditions | duction |
| Com. Ex. 3 | 35 nm | 84% | 10% | A | A |
| Com. Ex. 4 | 0 nm | 0% | 23% | A | B |

As is apparent from the results shown in Table 1, the stimulable phosphor layer of the radiation image storage panels of the invention (Examples 1 to 6) in which the stimulable phosphor layer was placed on the matrix co pound layer covering almost whole surface area of the substrate are strongly fixed on the substrate. These conditions of prismatic crystals are good, and the reproducibility of sensitivity is good.

In contrast, the stimulable phosphor layer of the conventional radiation image storage panels having no matrix compound layer (Comparison Examples 1 and 4) is easily separated from the substrate. The stimulable phosphor layer placed on an extremely thin matrix compound layer (Comparison Example 3) is also easily separated from the substrate. The stimulable phosphor layer placed on an activator compound layer (Comparison Example 2) is also easily separated, and both of the conditions of prismatic crystals and reproducibility of sensitivity are unsatisfactory.

What is claimed is:

1. A radiation image storage panel comprising a support, a phosphor matrix compound layer covering a surface of the support at a coverage percentage of 95% or more, and a stimulable phosphor layer formed on the phosphor matrix compound layer, the stimulable phosphor layer comprising multiple prismatic stimulable phosphor crystals standing on the phosphor matrix compound layer, wherein said phosphor matrix compound layer excludes an activator.

2. A process for preparing a radiation image storage panel of claim 1 comprising the steps of:
    forming a phosphor matrix compound layer on a surface of a support by vapor deposition whereby the phosphor matrix compound layer covers the surface at a coverage percentage of 95% or more; and
    placing a stimulable phosphor layer comprising multiple prismatic stimulable phosphor crystals on the phosphor matrix compound layer by vapor deposition.

3. The process of claim 2, wherein the step of forming a phosphor matrix compound layer by vapor deposition and the step of placing a stimulable phosphor layer by vapor deposition are performed successively.

4. The process of claim 2, wherein the stimulable phosphor layer comprises a stimulable phosphor comprising a phosphor matrix element and an activator element, and the step of placing a stimulable phosphor layer by vapor deposition is performed by vaporizing a vaporization source comprising a phosphor matrix compound and a vaporization source comprising an activator compound simultaneously and depositing the vaporized sources on the matrix compound layer.

5. The process of claim 2, wherein the step of placing a stimulable phosphor layer by vapor deposition is performed at a pressure of 0.3 to 3 Pa in the presence of an inert gas.

6. The radiation image storage panel of claim 1, wherein the stimulable phosphor layer is placed on the phosphor matrix compound layer by vapor deposition.

7. The radiation image storage panel of claim 1, wherein the phosphor matrix compound layer is placed on the surface of the support by vapor deposition.

8. The radiation image storage panel of claim 1, wherein the phosphor matrix compound layer comprises phosphor matrix compound particles which are placed on the surface of the support and combined with each other.

9. The radiation image storage panel of claim 1, wherein the phosphor matrix compound layer has a thickness in the range of 50 nm to 100 µm.

10. The radiation image storage panel of claim 1, wherein the stimulable phosphor is an alkali metal halide phosphor having the formula (I):

$$M^{I}X \cdot aM^{II}X'_{2} \cdot bM^{III}X''_{3}:zA \qquad (I)$$

in which $M^{I}$ is at least one alkali metal element selected from the group consisting of Li, Na, K, Rb and Cs; $M^{II}$ is at least one alkaline earth metal element or divalent metal element selected from the group consisting of Be, Mg, Ca, Sr, Ba, Ni, Cu, Zn d Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; each of each of X, X' and X" independently is at least one halogen selected from the group consisting of F, Cl, Br and I; A is at least one rare earth element or metal element selected from the group consisting of Y, Ce, Pr, Nd, Sm, Eu, Gd, Tb, Dy, Ho, Er, Tm, Yb, Lu, Mg, Cu, and Bi; and a, b and z are numbers satisfying the conditions of $0 \leq a < 0.5$, $0 \leq b < 0.5$ and $0 < z \leq 1.0$, respectively.

11. The radiation image storage panel of claim 1, wherein the stimulable phosphor is an europium activated cesium bromide phosphor.

* * * * *